April 14, 1970 J. R. DE PRIEST 3,506,964

CODE TRANSMISSION SYSTEM

Filed April 27, 1966 6 Sheets-Sheet 1

INVENTOR
Joseph R. DePriest
BY
W. L. Stout
HIS ATTORNEY

April 14, 1970 J. R. DE PRIEST 3,506,964

CODE TRANSMISSION SYSTEM

Filed April 27, 1966 6 Sheets-Sheet 2

April 14, 1970 J. R. DE PRIEST 3,506,964

CODE TRANSMISSION SYSTEM

Filed April 27, 1966 6 Sheets-Sheet 3

INVENTOR
Joseph R. DePriest.
BY
W. L. Stout
HIS ATTORNEY

CODE TRANSMISSION SYSTEM

Filed April 27, 1966 6 Sheets-Sheet 4

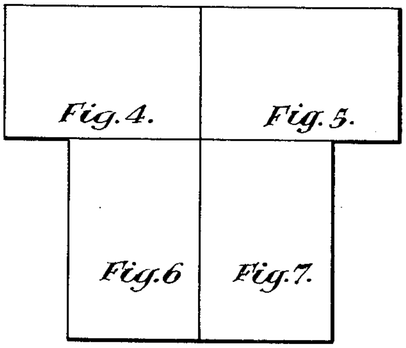
Fig.8.
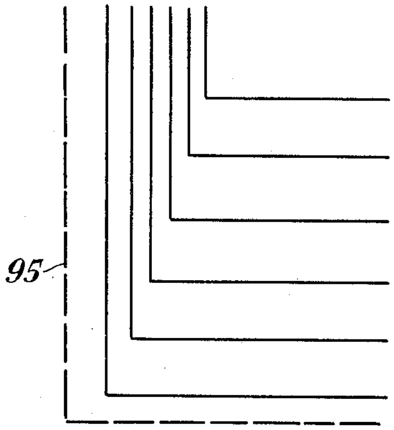
Fig.6.
Fig.9.
| | Control Code Transmitted from Central Office. | | | Indication Request Code Transmitted from Central Office. | | |
|---|---|---|---|---|---|---|
| | f1 | f2 | f3 | f1 | f2 | f3 |
| Select Station. | S | M | M | M | M | S |
| Control Power To Track Switches (N) | C | M | M | M | M | C |
| Control Power To Track Switches (R) | C | S | S | M | M | M |
| Clear the Signal. Train Going to Right. (R) | C | S | M | M | S | S |
| Clear the Signal. Stop Function Red Light (N) | C | C | M | M | S | C |
| Clear the Signal. Train Going to Left. (L) | C | M | S | M | S | M |

United States Patent Office 3,506,964
Patented Apr. 14, 1970

3,506,964
CODE TRANSMISSION SYSTEM
Joseph R. De Priest, Richmond, Va., assignor to Westinghouse Air Brake Company, Swissvale, Pa., a corporation of Pennsylvania
Filed Apr. 27, 1966, Ser. No. 545,758
Int. Cl. H04q 1/45, 5/12
U.S. Cl. 340—151                          6 Claims

ABSTRACT OF THE DISCLOSURE

The invention in its most elemental form requires the field locations to each have a command receiver and a field component function indication transmitter, plus one or more components whose function is to be controlled. Each of the control command transmitters is capable of producing a first, second and third signal level output. The first signal level output may be utilized to controllably select a command receiver at a remote location, while the second signal level output may be utilized in the control of a component's function through the command receiver at the remote location. Finally, the third level signal output may be employed to interrogate one of the remote components through the command receiver at the field location and to simultaneously condition this field component function indication transmitter through the command receiver to transmit a signal indicative of the selection of a command receiver and the function of one or more components. The field function indication receivers at the control location are responsive to the output from field component function transmitters to produce an output indicative of the station selected and the function of the remote component or components.

---

Figure 1:
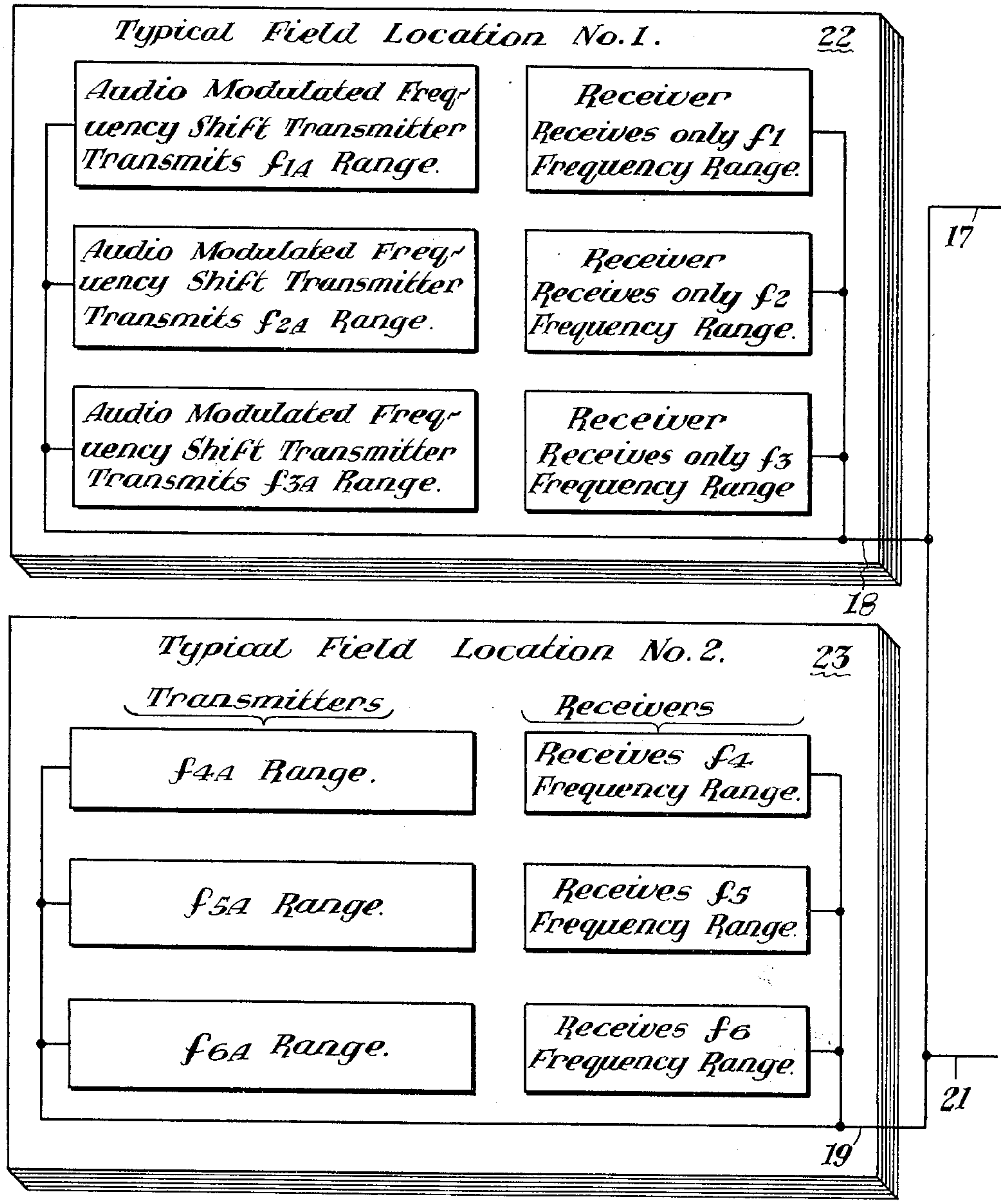

This invention relates to a code transmission system having a central command control location and at least one remotely controlled field location.

More specifically, this invention relates to a code transmission system that is uniquely adaptable to the transfer of commands to a vast number of remote field locations while simultaneously providing a telemetering capability of only one or all of the remote field locations. This is accomplished by the utilization of command control transmitters and field function indication receivers provided at the control location. The invention in its most elemental form requires the field locations to each have a command receiver and a field component function indication transmitter, plus one or more components whose function is to be controlled. Each of the control command transmitters is capable of producing a first, second and third signal level output. The first signal level output may be utilized to controllably select a command receiver at a remote location, while the second signal level output may be utilized in the control of a component's function through the command receiver at the remote location. Finally, the third level signal output may be employed to interrogate one of the remote components through the command receiver at the field location and to simultaneously condition this field component function indication transmitter through the command receiver to transmit a signal indicative of the selection of a command receiver and the function of one or more components. The field function indication receivers at the control location are responsive to the output from field component function transmitters to produce an output indicative of the station selected and the function of the remote component or components.

The invention will be described in the railway signaling field where the invention finds a particularly adaptable environment. In the past the use of direct current coding of information to distant stations over a single transmission line has been fraught with problems. For example, while many of the direct current code systems have been expanded to cover many stations to be controlled at significant distances, the use of these codes places inherent limitations on the amount of information transmitted as well as the speed at which these conventional coding systems could deliver commands and interrogate the field stations. The employment of conventional coding systems for large railway facilities has required the use of large costly custom made filters to permit the passage of direct current signals when carrier telephone systems were superimposed on a code transmission line. In addition, the telephone filters when used on a direct current code line tend to distort the direct current coded signal under some conditions, thereby causing improper indications. Furthermore, the prior art systems were slow and therefore incapable of coping with the modern high speed rapid transit systems of today. These systems, because of their need to generate a code by the use of relays, were subject to a constant maintenance problem with reference to relay contact wear. Also, the number of field stations per transmission line were limited. The system embodying the invention to be described solves all these problems in a unique and highly advantageous manner.

It is therefore an object of this invention to increase the speed of the code transmission more than thirty times as fast as the direct current code systems through the use of an audio frequency modulation frequency shifted code.

Another object of this invention is to provide a code transmission system that avoids the use of costly custom made filters in the transmission lines by the utilization of an audio modulated frequency shifted code.

And yet another object of this invention is the use of a code that uniquely lends itself to the use of solid state construction of the code generation equipment, thereby avoiding the inherent maintenance problem and the limited number of stations per line present in the prior art relay code generating systems.

Another object of this invention is the provision of unique audio modulated frequency shifted code which may be advantageously employed in a railway signaling environment as well as any situation where a remote component or components and their function is to be controlled or determined.

In the attainment of the foregoing objects, the system embodying the invention provides for the rapid transfer of information from one location, the office where the controlling machine of a railroad traffic control system is located, to each of many field locations where switches and signals are located and controlled remotely from the office control machine. The system also provides a means for the rapid transfer of information in the reverse direction, without mutual interference, from each of the field locations to the office to indicate the positions of component functions such as the position of switches and signals and the location of trains. The code system of the invention may be used in existing conventional systems of the type equipped with magnetic stick relays as the input elements to the conventional field equipment. The office and the most distant field location are connected by a conventional voice transmission communication circuit to which the intermediate field locations are connected in multiple. In the preferred embodiment of the invention there are at each field location three transmitters and three receivers each tuned to produce or receive a different range of audio frequency modulated frequency shifted signals. The transmitters and receivers of a particular field location are tuned to different frequencies to permit operation in opposite directions without mutual interference. In the preferred embodiment of the invention a total of nine frequencies, each different, are used for transmitters at the central office and receivers in the field operating in one direction, while a different group of nine frequencies are utilized for transmitters and receivers operating in the opposite direction. This arrangement is capable of controlling 334 stations when three frequency modulated telegraph carriers are provided at each field location and a total of nine such units at the controlling point at the central office are operating within a 200 to 3,000 cycles per second frequency which are used for control functions and a like number are used for indications.

Each of the nine audio frequency transmitters at the central location is designed to transmit an alternating current sine wave at all times. Each of these alternating current signals can be shifted ±35 c.p.s. from its center position. The different frequencies of each carrier are named "mark," "center" and "space," with the highest frequency, and the lowest frequency being "mark" and "space," respectively.

Figure 3:
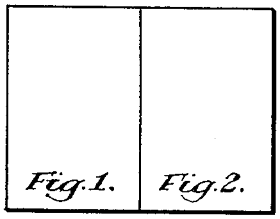
Figure 2:
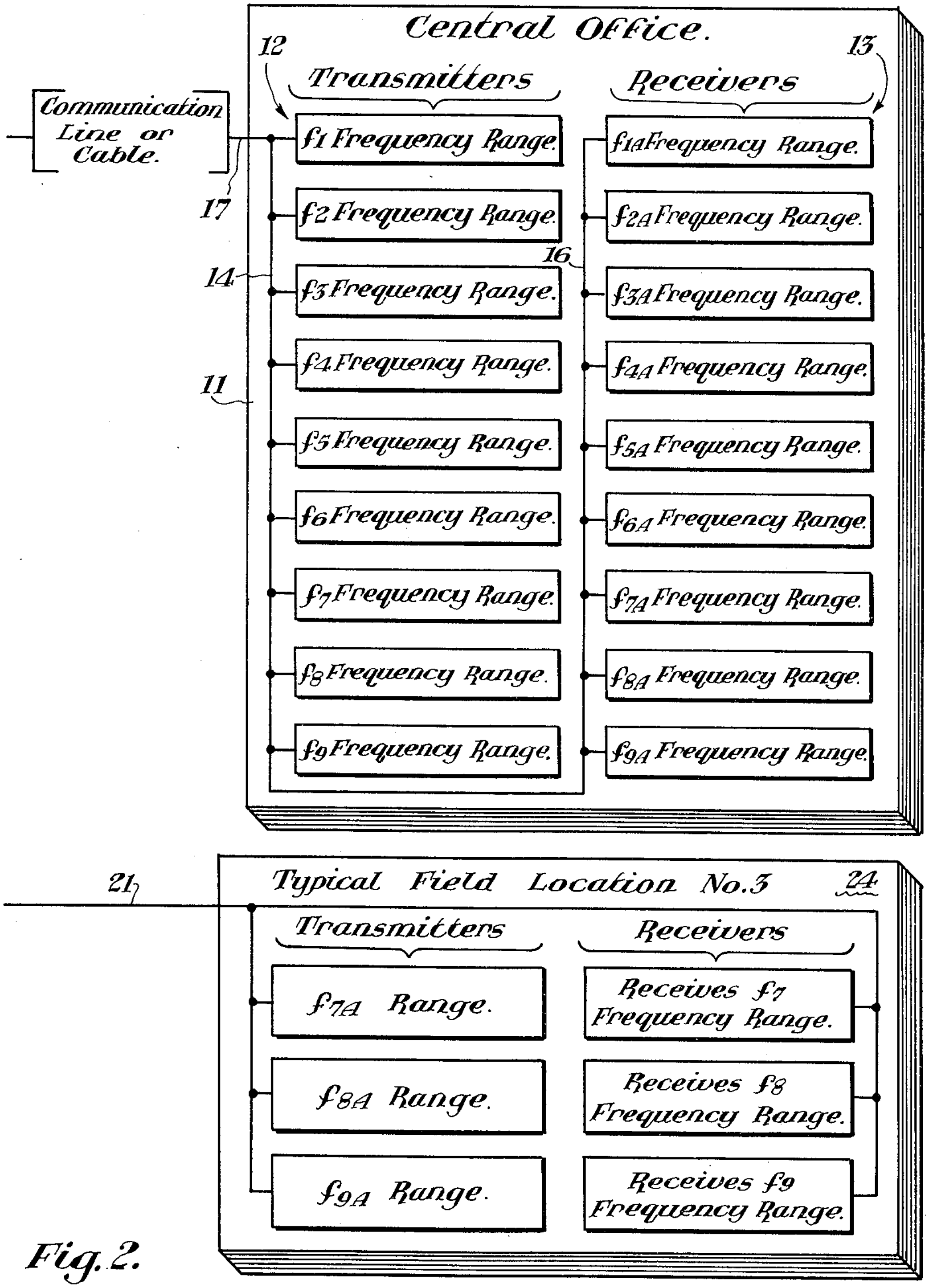

Other objects and advantages of the present invention will become apparent from the ensuing description of illustrative embodiments thereof, in the course of which reference is made to the accompanying drawings in which:

FIG. 1 and FIG. 2 taken together as shown in FIG. 3 depict in block diagram form an embodiment of the invention.

FIG. 4, FIG. 5, FIG. 6 and FIG. 7 taken together in the manner depicted in FIG. 8 illustrate a simplified circuit diagram which illustrates one possible embodiment of the invention.

FIG. 9 is a chart representing a typical possible code to be applied to the system of FIG. 3 to FIG. 7, inclusive.

A description of the above embodiments will follow and then the novel features of the invention will be presented in the appended claims.

Reference is now made to FIGS. 1 and 2 which, when taken together in the manner shown in FIG. 3 set forth a portion of a system embodying the invention. These two FIGS. 1 and 2 show only a very small portion of this system's basic capability in that there is depicted a central office 11 connected to a series of typical field locations Nos. 1, 2 and 3 via communication line or cable 17. Each of the stations is connected electrically by the cables 18, 19 and 21 to the communication line or cable 17 which extends back to the central office. It will be appreciated that the full capability of the system and all the possible combinations of frequencies and frequency ranges, transmitters and receivers, are capable of providing control to more than 300 different stations. In this instance, only three typical field locations or stations are set forth. For example, typical field location No. 1 has in it three audio modulated frequency shift transmitters and three receivers. It will be noted that the typical field location No. 1 has an audio frequency shift transmitter which transmits in what will be designated the *f*1A range. A second audio frequency transmitter transmits in the *f*2A range and a third audio modulated frequency shift transmitter operates in the *f*3A range.

These transmitters just mentioned provide a means for transmitting indications back to the central office. Typical field location No. 1 also has three receivers. Each receiver is capable of operating in the *f*1 frequency range, *f*2 frequency range, and *f*3 frequency range, and these three receivers take on a command receiving function in the system to be described hereafter. It will be appreciated that in the central office there are depicted nine transmitters whose frequency outputs vary from the *f*1 frequency range to an *f*9 frequency range and these transmitters are connected by electrical leads 14 to the communication line or cable 17. In a similar manner there are nine receivers in the central office and these nine receivers operate from the *f*1A frequency range to an *f*9A frequency range, and are connected by electrical leads 16 and 14 to the communication line or cable 17. Hereafter the transmitters in the central office generally designated as 12 and the receivers generally designated as 13 will be referred to as command transmitters and function indication receivers as the description proceeds. Again it should be realized that only three field locations have been depicted to enhance the understanding of the type of combinations that may be obtained with the frequency ranges available. Each one of the typical field locations in the system under consideration will be capable of controlling a number of component functions at some remote location. It will be appreciated, of course, that within the basic limitations of the code which will be explained hereafter, more than one field location or station as it may be termed may be required to handle all of the functions present at some specific remote point. In the system that will be described, only the most elementary arrangement is going to be considered for the novel coding arrangement may be understood more clearly without the presentation of the most complex environment under which the code system may operate. It is intended that the elementary circuit diagrams to be set forth hereafter are exemplary of an embodiment of the code system, which embodies the invention, and are not intended to in any way limit the logical extrapolation of the invention into systems where greater numbers of frequency ranges and greater numbers of possible combinations of frequencies may be employed to expand the system ad infinitum to produce the maximum desirable transmission of codes and command functions to a vast multiple of remotely located components, and simultaneously provide for the interrogation of all components located remotely to determine whether the components have functioned as commanded.

As the description proceeds, it will be appreciated that there is the basic capability of commanding a remote component function and also requesting or interrogating the component in the field to determine whether it has responded to the command transmitted by the code. The system also provides the ability to determine whether a specific station or typical field location which is initially selected has, in fact, been selected, and only if the remote field location has actually received the selection code will the station permit the passage of a command code signal to a component. In a like manner, only if the station or typical field location has been properly selected, will a code which requests an interrogation of the components at that location be permitted to pass through to the typical field location and induce the transmission of a series of signals indicative of the component's function.

Figure 4:
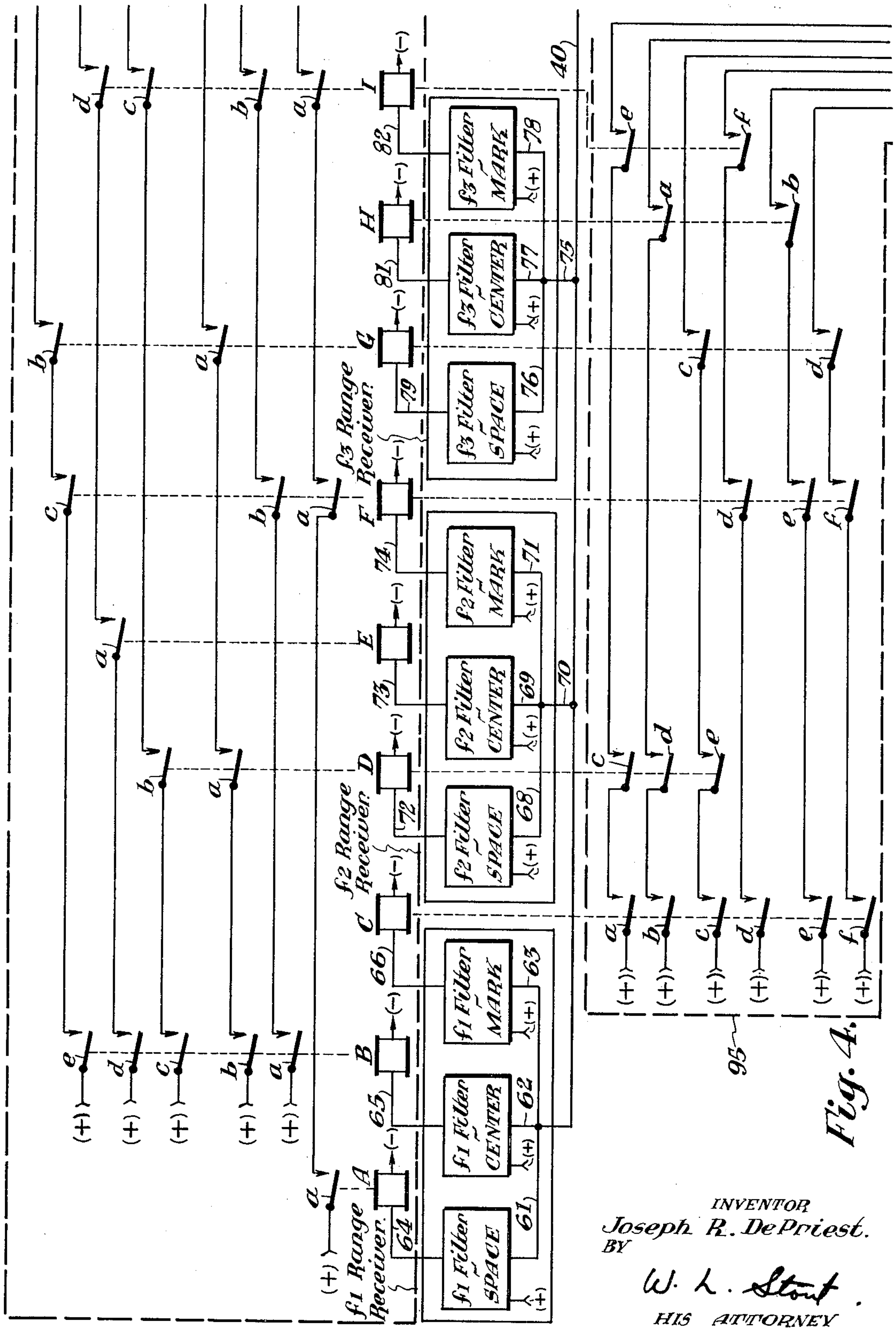
Figure 5:
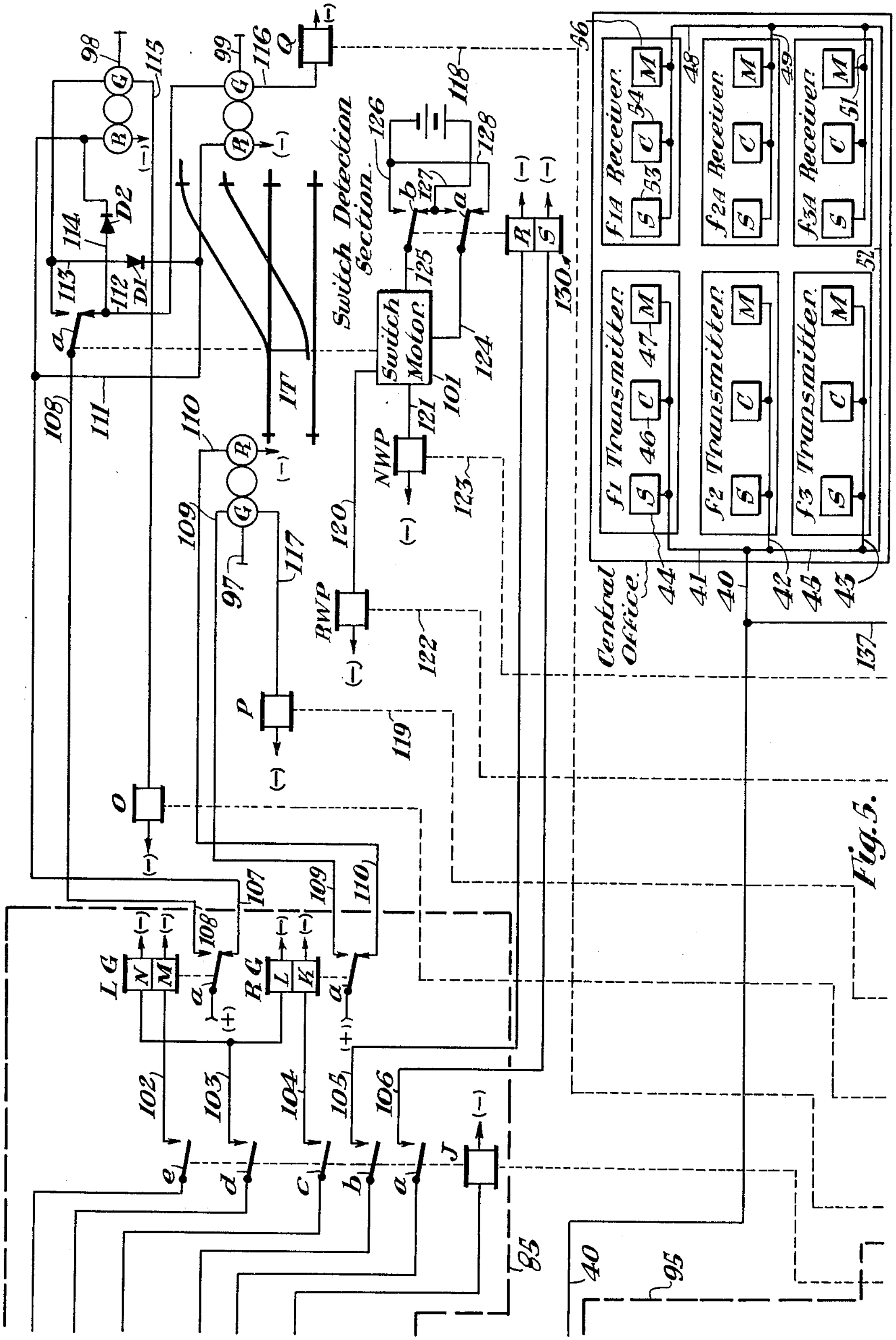
Figure 7:
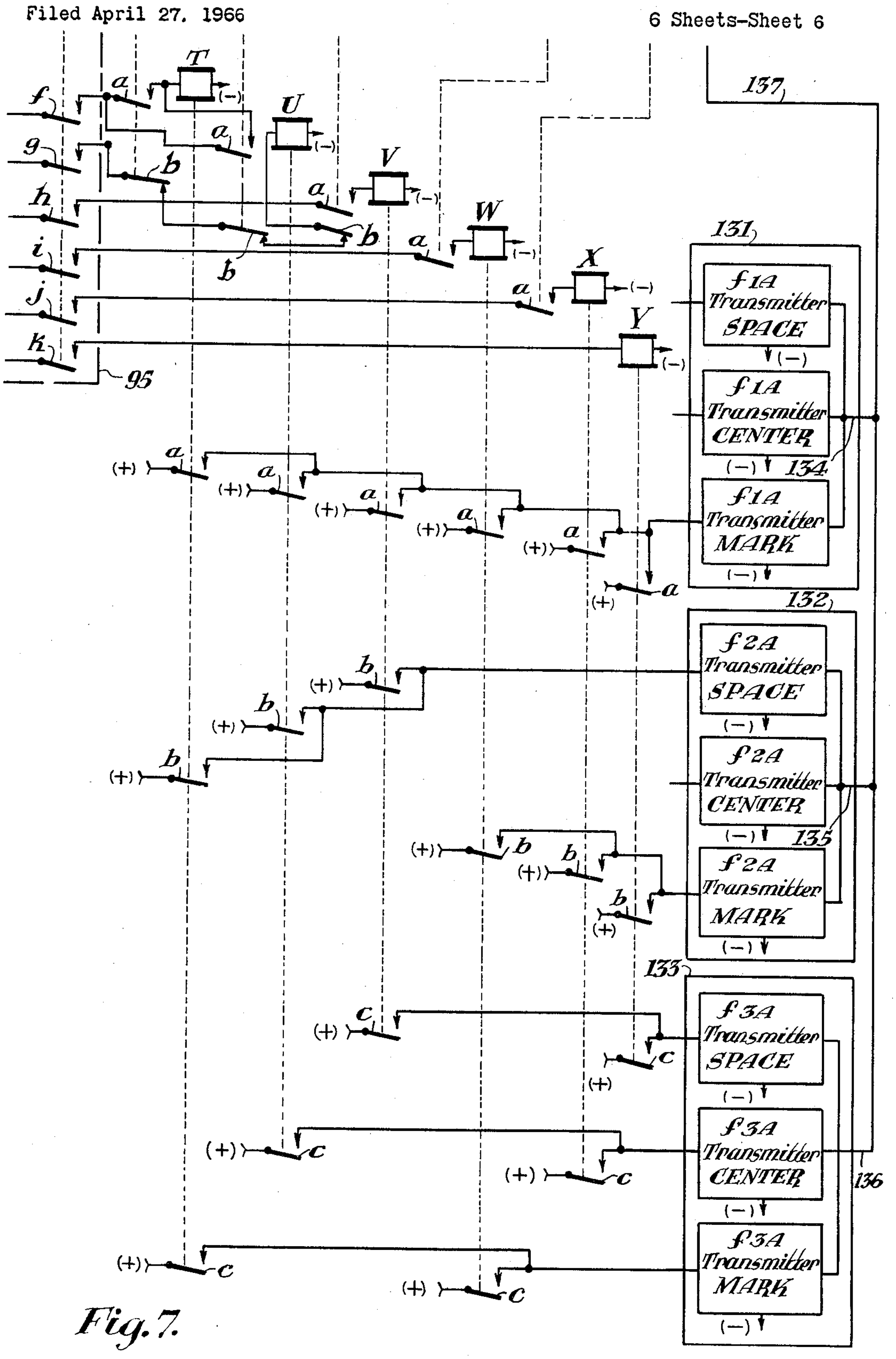

Reference is now made to FIGS. 4, 5, 6, and 7 which, when taken together in the manner depicted in FIG. 8, set forth an elementary circuit arrangement which is capable of utilizing the code system of the invention. It will be appreciated that this elementary circuit represents a simplified typical field location in that FIG. 5 depicts therein a switch detection section which might be found at some remote location. FIG. 5 also contains in the lower right-hand corner a central office from which the command codes for this system are to originate. All the remaining circuits that are depicted in FIGS. 4, 6 and 7 are to be found at the remote location or station. FIG. 5 sets forth a railway signaling environment in which there is depicted a switch detection section and a number of components to be controlled such as light signals 97, 98, 99, as well as a switch motor 101. These components could be any remotely located component whose function is to be controlled, and the system is therefore not to be limited to a railway signaling environment but is only to be viewed from the standpoint that this is a typical environment in which the capabilities of the code transmission system of the invention may be employed to obtain the maximum benefit derived from the code transmission system to be described.

The system in this elementary form has the following major components; first, the central office noted earlier which contains in this simplified version, three transmitters which have been arbitrarily designated an *f*1 transmitter, an *f*2 transmitter, and an *f*3 transmitter. The *f*1 transmitter has a transmitting means 44, which will transmit what is to be referred to hereafter as a code signal of a lower level. By this it is meant that the carrier is modulated by an audio frequency which is frequency shifted from some predetermined frequency; for example, the frequency shift may be on the low side 35 cycles per second, and on the high side another 35 per cycles per second. When the modulation frequency shift is on the low side of the center this signal will be termed a "space" and the transmiter 44 which has depicted therein an S will deliver an audio modulated signal frequency shifted approximately 35 cycles per second below a predetermined center frequency of the *f*1 transmitter. In a similar manner, when the modulation frequency is not shifted, there will be delivered from the transmitting means 46, which has a C designated therein, what will be referred to hereafter as a "center." When the modulation frequency shift is on the high side of "center," the transistor 47 which has an M designated therein will deliver what will be referred to as a "mark." In other words, there is for each one of the transistors *f*1, *f*2, and *f*3, a capability of delivering a frequency shifted modulated signal which is either a "space," a "center," or a "mark," depending on whether or not the code selected, which code is to be set forth hereafter, is to deliver a frequency shifted modulated signal which is on the low side of the center frequency, on the center frequency, or on the high side of the center frequency. Each of the remaining two transmitters has similar transmitting means which have been designated with an S for "space," a C for "center," and an M for "mark." These transmitting means are electrically connected via the leads 41, 42 and 43 to an electrical lead 45 which in turn is connected to the code communication line or cable 40 which goes to the remote field location shown in the remaining FIGS. 4, 6 and 7.

There is also located at the central office indication receiving means that would take the form of a series of receivers *f*1A, *f*2A and *f*3A. It will be appreciated here that while it is not depicted, it is intended to include a decoding means connected electrically to the *f*1A receiver, the *f*2A receiver, and the *f*3A receiver. The function of this decoding network will be better appreciated when the nature of the code is described hereafter in a typical application of a code to produce a required number of functions in the field. Each of the range receivers *f*1A, *f*2A and *f*3A has tuned filters which will receive respectively a signal which is indicative of a "space," a "center," or a "mark" in the *f*1A range. The signals that these receivers *f*1A, *f*2A and *f*3A obtain are transmitted from the typical field location by the indication transmitters 131, 132, and 133 of FIG. 7. The receivers *f*1A, *f*2A and *f*3A are each respectively electrically connected by the leads 48, 49, 51, 52 and 45 to the communication line or cable 40 which passes outwardly to all the typical field locations, in this instance only one of them being shown.

At a typical field location, in this instance the switch detection section depicted in FIG. 5, there are the following major components: First, there are the command receiving means which take the form of the *f*1, *f*2 and *f*3 range receivers, all shown in FIG. 4. At FIG. 4 there are shown in dotted outline two other major components. These are designated as the "station selection component function control means 85" positioned directly above the bank of *f*1, *f*2 and *f*3 range receivers. Positioned directly beneath the bank of range receivers just noted, and shown in dotted outline, is the "station selection and component function indication means 95." The operation of these two just recited means will be made evident when a study is made of FIG. 9 and the chart depicted therein which sets forth a typical code and its employment to produce the desired function and an interrogation of the field components essential to the control of the railway signals involved.

Reference is now made to FIG. 9 which sets forth in chart form a typical use of the code involved in this invention. It will be appreciated that there are two major sections to the chart, one of which is designated the "control code transmitted from the central office." To the left of the chart is a column which designates the types of controls desired at the remote location. For example, there is a "select station" function which is set forth as well as one which is to "control power to track switches" and a third to "clear the signal" at the track section. From the arrangement of the chart it will be appreciated that it is desirable to also be able to interrogate the field location to determine (1) if the station has in fact been selected, and (2) whether or not the power control to track switch has been effected, or in fact whether the signals have been cleared. This capability is provided by the code set forth in the right-hand portion of the chart under the heading entitled "Indication Request Code Transmitted From the Central Office." The code transmitted from the central office, for example, in selecting a station would take the form in this hypothetical situation of a "space" of the *f*1 frequency, a "mark" of the *f*2 frequency, and a "mark" of the *f*3 frequency. Accordingly, once a determination has been made in the central office to select any specific station, or in this instance the only one shown, a code utilizing the possible combinations present may be selected to pick any station to be controlled. In this instance, the first signal to be transmitted would be a "space" in the *f*1 and a "mark" in the *f*2 and *f*3 ranges. This signal would be delivered from the central office over the lead 40 and simultaneously delivered to the *f*1, *f*2 and *f*3 range receivers. At this point, it can be appreciated that each of the range receivers *f*1, *f*2 and *f*3 has filters positioned therein tuned to the corresponding "space," "center," or "mark" frequency shift signals for the particular range receiver and these correspond to the transmitter ranges set forth in the central office. Accordingly, the *f*1 range receiver is electrically connected by leads 61, 62 and 63 to the main communication line 40. The "space," "center" and "mark" filters of the *f*2 range receiver are connected by leads 68, 69, 70 and 71 to the code communication line 40 and the "space," "center" and "mark" filters of the *f*3 range receiver are connected by leads 76, 77, 78 and 75 to the code communication line 40. Each one of the filters when presented with the signal to which it is tuned will permit energy to flow from a positive battery terminal through an output electrical lead to a relay positioned directly above each one of the filters. In this case the *f*1 range receiver has the *f*1 filter for the space code connected by electrical lead 64 to a relay A. The center filter for the *f*1 code is connected by electrical lead 66 to the relay B. The mark filter of the *f*1 frequency range is connected by the electrical lead 66 to the relay C.

The *f*2 range receiver has a "space" filter electrically connected via the lead 72 to a relay D and the "center" filter is electrically connected via the lead 73 to the relay E and the "mark" filter is connected by the electrical lead 74 to the relay F. The *f*3 range receiver has a "space," "center" and "mark" filter respectively connected to relays G, H and I by electrical leads 79, 81 and 82, respectively. Keeping in mind the fact that the presence of an appropriate signal at one of the filters of each of the range receivers *f*1, *f*2 and *f*3 will permit the energization of one of the relays A, B, C, D, E, F, G, H or I, the following system function may occur. In this first instance, the command delivered from the central office is to select the station and the code takes the form shown in the chart of FIG. 9. Therefore, the only filters which will pass the signal which will permit their respective relays to be energized will be the "space" filter of the *f*1 receiver, the "mark" filter of the *f*2 receiver, and the "mark" filter of the $f3$ receiver. Upon the receipt of this coded signal, the relay A of the $f1$ range receiver, the relay F of the $f2$ range receiver, and the relay I of the $f3$ range receiver will pick up and complete a circuit which will cause the relay J to be actuated. The circuit which permits energy to be delivered to the station selection control relay J is from the positive battery terminal, the front contact *a* of the relay A and the front contact *a* of the relay F, and the front contact *a* of the relay I to the relay J, and thence to the negative battery terminal. It will be appreciated that this relay J with its contacts depicted above and beneath is effective to control all the remaining circuits at the field location for the contacts *a, b, c, d, e, f, g, h, i, j* and *k* of the relay J are all involved in a control circuit or in an indication circuit which will be appreciated from a study of the command codes and the indication request codes which will be subsequently transmitted. Only when a station has been selected and the relay J is in a pick-up condition will the remaining circuits at the field location function to either produce or permit the passage of the command or a request for an indication. Therefore, unless the station has been properly selected by the appropriate code, no request for an indication or a command to the field will be responded to. It is, therefore, important to recognize that the stations must first be selected before either a command may be transmitted or an indication requested.

There is depicted at the switch detection section in FIG. 5 a switch motor 101 which has power controlled to it through a circuit shown to the right of the switch motor 101. The switch motor will move the switch points to either a normal or a reverse position to cause the train passing through the switch detection section to move into the siding or pass through on the main line. The circuitry that permits the switch motor to be operated to a normal position or to a reverse position takes the form of a circuit controlled by a relay 130 with windings R and S. This relay 130, when the relay winding S is energized, will hold the contacts *a* and *b* on the back contacts of this relay 130 and permit energy to be delivered from the battery power source through the leads 128 and 127, over the back contacts *a* and *b* of the relay 130 to the switch motor 101, and when the winding R of the relay 130 is energized, the relay 130 will pick up and move the contacts *a* and *b* into the front contact position completing a circuit over the electrical leads 126 and 127 from the battery power source over the front contacts *b* and *a*, respectively, to the switch motor 101 to cause the switch points to move in the opposite direction.

Returning now to the chart in FIG. 9. After the station has been selected and there is a desire to control power to the track section to, for example, place the switch in the normal position, the code is as there designated in FIG. 9, a "center" in the $f1$ frequency, a "mark" in the $f2$ frequency, and a "mark" in the $f3$ frequency. The delivery of this coded signal via the code communication line 40 to the $f1$, $f2$ and $f3$ range receivers will produce the following complete circuits. In a manner similar to that explained with reference to the station selection function, the delivery of this code: "center," "mark," "mark" of the $f1$, $f2$ and $f3$ frequency range will cause the relay B electrically connected to the $f1$ range receiver to be picked up and both the relays F and I of the $f2$ and $f3$ range receivers. With relay B of the $f1$ range receiver and relays F and I of the $f2$ and $f3$ range receivers picked up, the following circuit will be completed to control delivery of power to the relay 130, which in turn controls the power circuit of the switch motor 101.

The circuit completed to control the switch motor 101 to place the track switch in the normal position is as follows: from the positive battery terminal the front contact *a* of the relay B, the front contact *b* of the relay F, the front contact *b* of the relay I, the front contact *a* of the relay J, lead 106, winding S of the relay 130 to the negative battery terminal. This will cause contacts *a* and *b* of the relay 130 to assume a position as shown, on the back contacts depicted. This in turn will cause energy to be delivered to the switch motor and the switch motor will move to this normal position. At this point it will be appreciated that in the circuit just traced, if the station here described had not been selected due to the failure of the code for some reason to reach the station, the relay J would not have been picked up and accordingly its contact *a* would not have been opened. This, of course, would have interrupted the command circuit essential to permit the operation of the switch motor 101.

In the event that it is desired to move the switch motor to the reverse position as the chart in FIG. 9 indicates, the code would be a "center" in the $f1$ frequency range and "space" in the $f2$ and $f3$ frequency ranges. This signal, a "center," "space," "space" delivered from the central office would cause the energization of the relays B, D and G. Therefore, a circuit would be completed to the relay 130 from the positive battery terminal, front contact *b* of the relay B, front contact *a* of the relay D, front contact *a* of the relay G, front contact *b* of the station selection control relay J, lead 105 to relay winding R of the relay 130 and thence to the negative battery terminal. This would cause the relay 130 to pick up completing circuits to deliver power to the switch motor 101 over the front contacts *a* and *b* of the relay 130. This would cause the switch motor to reverse the direction of its output and move the track switch to its reverse position.

Reference is now made again to the chart of FIG. 9 and to the typical order that might be delivered to the field location to clear the signal in the event that a train was passing to the right. In this instance, the code would then be a "center" in the $f1$ frequency, a "space" in the $f2$ frequency, and a "mark" in the $f3$ frequency. The delivery of this code of the center space and a mark in the $f1$, $f2$ and $f3$ frequency ranges, respectively, would cause the relays B, D and I to pick up and this would result in completion of the following circuit from a positive battery terminal, front contact *c* of the relay B, front contact *b* of the relay D, front contact *c* of the relay I, front contact *c* of the relay J, lead 104, winding K of the relay RG to the negative battery terminal. This would cause the relay RG to pick up and complete a circuit over the front contact *a* of the relay RG, lead 109 to turn on the green signal light G of the signal 97. It should be appreciated that the green signal light has in its circuit a relay P connected to the other side of the green signal light by the lead 117. Accordingly, when energy is delivered to the green signal light G of signal 97, the result or completion of this function will be reflected in the fact that the relay P will also be energized, and the output of this relay P will be an indication of whether the function has actually been completed.

It should also be noted that in a similar manner when the switch motor 101 was actuated to a normal and reverse position, the relays RWP and NWP, respectively, electrically connected by leads 120 and 121 to the switch motor 101 would be energized by conventional circuitry to show the fact that the switch motor had actually moved the switch to the position demanded. Accordingly, when the switch is moved to a normal position the relay NWP will be energized and its output 123 will cause a related contact to be picked up indicative of the fact that the function commanded of the switch motor had in fact been performed. In a similar manner the output 122 of the relay RWP would pick up a contact that this relay controls and it would also be indicative of whether the function commanded of switch motor 101 had in fact been performed.

The outputs 119, 122 and 123 from the relays P, RWP and NWP will all be explained with reference to the interrogation of mode of operation of the code control system. Diodes D1 and D2 in leads 114 and 113 are a conventional means of preventing sneak circuits from originating.

Reference is now again made to the chart of FIG. 9 and the next command function to be described is that where the stop function or the red light is required and in this control mode the code would be in the *f*1, *f*2, *f*3 frequency range, a "center," a "center" and a "mark" respectively. The delivery of this code via the code transmission line 40 would cause the following relays to be energized and picked up—relay B, relay E, and relay I. With these relays picked up, the following command control circuit would be completed from a positive battery terminal: front contact *d* of relay B, front contact *a* of relay E, front contact *d* of relay I, front contact *d* of relay J, lead 103, to windings N and L of relays LG and RG, respectively, to thereby command the outputs of these relays to call their respective contacts *a* to a similar position on the back contacts. With these relays in the down position completing circuits over the back contacts, the following pair of electrical circuits would be completed. Taking first the circuit completed by the movement of the contact *a* of the relay LG, this circuit is completed from the positive battery terminal, the back contact *a* of the relay LG, the electrical lead 107, lead 111, to the red light signal 99, and to the red light of light signal 98. This would cause the red light to turn on.

The circuits completed by the energization of the RG relay would be over the back contact *a* of the relay RG from a positive battery terminal and include the lead 110 to the red light of the signal 97.

The last remaining function which is to be described in this hypothetical situation is that where the train is moving to the left, and as the chart in FIG. 9 indicates the code there would be a "center," a "mark" and a "space" for the frequencies *f*1, *f*2 and *f*3, respectively. This would cause the relays B, F and G to be energized and this would complete the following command control circuit from the positive battery terminal over the front contact *e* of relay B, front contact *c* of relay F, front contact *b* of relay G, front contact *e* of relay J, to the winding M of the relay LG, to a negative battery terminal. This would cause a circuit to be completed over the front contact *a* of the relay LG to the positive battery terminal and this circuit would include the front contact *a*, lead 108, and the contact *a* in normal position from the switch motor 101, lead 112 to the green light of the signal 99 and the circuit will go on to include lead 116 and relay Q to a negative battery terminal. Accordingly, when this green light is turned on as a result of the command control function sent from the central office, the relay Q will pick up and provide an output which will be utilized in the interrogation mode of operation.

Up until this point of the description, the only relay contacts that have been discussed in detail are those which appear above the bank of range receivers *f*1, *f*2 and *f*3 and these contacts are included in what is termed a station selection and component function control means. It should be understood that this is but one possible way to perform the functions desired to bring about the resultant energization or actuation of the components located at the remote field location.

Directly beneath the range receivers *f*1, *f*2 and *f*3 is a second massive group of relay contacts. These relay contacts are included in what is termed the station selection and component function indication means shown in dotted outline 95. In order to understand the function of the remaining circuits reference is again made to the chart in FIG. 9 and the column which is designated "Indication Request Code Transmitted From Control Office." Here it will be seen that there is a code that may be transmitted from the central office which will interrogate the remote location or the field location, and by design this code will always be sent after a station has been selected for reasons that will become evident hereafter. For example, when the station has been selected it may then be followed by an interrogation code to determine if the station selected has in fact responded to the station selection code. This would be done by transmitting a code with a "mark" in the lowest frequency range and the code would then be "mark," "mark" and "space" for frequency ranges of *f*1, *f*2 and *f*3, and the delivery of this code of a "mark," "mark" and a "space" to the range receivers *f*1, *f*2 and *f*3 would cause the relays C, F and G to be energized. This will cause the completion of the following circuit to energize a relay Y. The circuit starts with a positive battery terminal, front contact *f* of the relay C, the front contact *f* of the relay F, front contact *d* of the relay G, front contact *k* of the relay J, relay Y and finally to a negative battery terminal. It will be appreciated that this circuit can only be completed if in fact the station has been properly selected by the delivery of a station selection code to the range receivers *f*1, *f*2 and *f*3 to permit relay J to be energized.

Depicted to the right of the station selection and component function indication means 95 are a series of relays designated T, U, V, W, X and Y. These relays when energized will provide outputs which may be utilized in the generation of a coded signal to be returned into the central office. In other words, whenever these relays T, U, V, W, X and Y are energized, their outputs will control the delivery of a code from the transmitters 131, 132 and 133. Again it should be understood that the technique for the generation of a specific code to be delivered back to the central office over the electrical lead 137 and the code communication line 40 is but one way to generate an indication code that may be utilized at the central office to determine if the component function or station selection has in fact been performed.

Returning now to the chart of FIG. 9, once the interrogation code has been delivered to the station to determine whether the station has been selected and the relay Y has picked up, it will be seen that if the relay Y is picked up, its contacts *a*, *b* and *c* will bring about the completion of three circuits which in turn will energize the *f*1A transmitter, *f*2A transmitter, and *fz*A transmitter to produce a code which will be a "mark," "mark" and a "space" delivered from the *f*1A, *f*2A and *f*3A transmitters, respectively, and this code will be delivered out over the electrical leads 134, 135 and 136, respectively. With relay Y picked up, a circuit is completed to the *f*1A transmitter from a positive battery terminal over the front contact *a* of relay Y to cause the *f*1A transmitter to produce a "marking" frequency output. In a similar manner a second circuit is completed over the front contact *b* of the relay Y and from a positive battery terminal to the *f*2A transmitter which produces a "marking" frequency, and finally a third circuit is completed over the front contact *c* of the relay Y from a positive battery terminal to the $F^3$A transmitter which produces a "space." Accordingly, the delivery of the interrogation code as noted earlier will produce in a different frequency range a coded signal output which will be a "mark," "mark" and "space" of the frequency ranges *f*1A, *f*2A and *f*3A which will be delivered to the central office and received by the *f*1A, *f*2A and *f*3A receivers, and this information can be decoded to provide an indication to the central office that the station in fact has been selected.

Returning now to FIG. 9 and the chart depicted therein, in the indication request mode of operation it should be kept in mind that after the command has been sent to the remote location and these commands have been performed or not performed, the energization of the relays O, P, RWP, NWP and Q will as has been noted be indicative of whether the desired function has actually taken place, since these relays O, P, RWP, NWP and Q are in the circuits involved in the control function that was transmitted earlier. Accordingly, each one of these relays operates one contact which is associated with the circuits that pass through the relays T, U, V, W and X and it is only when these relays are energized, which is indicative of the completion of a function, that a circuit will be completed which will permit an indication code to be transmitted from the transmitters 131, 132 and 133. Therefore, when the central office desires to determine whether the function of controlling power to the track section has been accomplished, for example, to move the switch to its normal position, it would send the code that would be "mark," "mark," "center" in the *f*1, *f*2 and *f*3 frequency range. This code would be delivered via the code communication line 40 and would result in the energization of the relays C, F and H. When these relays are energized the circuit would be completed as follows: from a positive battery terminal, contact *e* of the relay C, contact *e* of the relay F, contact *b* of the relay H, contact *j* of the relay J, contact *a* of the relay NWP to relay X and finally a negative battery terminal.

It should be appreciated that the last contact to be completed in the circuit to permit the energization of the relay X is the contact *a* controlled by the relay NWP and only in the event that the switch motor has in fact moved the switch to its normal position will the relay NWP be energized. In the event that it has moved the switch to its normal position, the relay NWP will be energized and pick up its front contact *a*. This will result in a code being generated by the transmitters 131, 132 and 133. This code would be a "mark," "mark" and a "center" and the circuits needed to complete this would be completed respectively in the following manner: from a positive battery terminal, contact *a* of relay X to the *f*1A cuit is traced from a positive battery terminal, contact *b* of relay X to the *f*2A "mark" transmitter. The third and last circuit is traced from a positive battery terminal, contact *c* of relay X to the *f*3A "center" transmitter and this would therefore produce a signal which would be delivered over the leads 134, 135 and 136 to the lead 137 and thence to the code communication line 40 and back to the central office where the *f*1A, *f*2A and *f*3A receivers would receive the code and apply this information to the decoding apparatus not shown.

In order to determine whether the track switch is in a reverse position, the chart in FIG. 9 indicates the appropriate interrogation code will be a "mark," "mark," "mark" in the *f*1, *f*2 and *f*3 frequency ranges to be transmitted from the central office to the remote field location and the receivers *f*1A, *f*2A and *f*3A and their appropriate relays would be energized. The relays energized would therefore be C, S and I. This would complete a function indication circuit as follows: from a positive battery terminal over the front contact *d* of the relay C, the front contact *d* of the relay S, the front contact *f* of the relay I, the front contact *i* of the relay J, front contact *a* of the relay RWP to relay W and thence to a negative battery terminal. This circuit, of course, would only be completed if the last contact noted, that is contact *a* of the relay RWP, was in fact picked up, and as has been noted earlier, the relay RWP will only be energized if in fact the switch motor has moved the switch over to its reverse position and completed the function commanded earlier.

With relay W picked up, a code will be transmitted from the transmitters 131, 132 and 133 back to the central office. This code would be established by the completion of the following three circuits. The first circuit would be from a positive battery terminal over the front contact *a* of the relay W to the *f*1A "mark" transmitter to produce a "mark" signal; the second circuit would be from a positive battery terminal to the front contact *b* of the relay W to the *f*2A "mark" transmitter to produce a signal; and finally from a positive battery terminal over the front contact *c* of the relay W to the *f*3A "mark" transmitter and accordingly there would appear on the lead 137 to the code communication line 40 a "mark," "mark," "mark" signal which would be received at the central office and decoded in the same manner that the earlier codes were.

The three remaining indication requests are all in the area designated "clear the signal." The first code used is when a train is going to the right and the central office desires to determine if in fact the appropriate signals have been cleared or energized, and this would be accomplished by using a "mark," "space," "space" code to the *f*1, *f*2 and *f*3 frequency ranges. With a "mark," "space," "space" code delivered to the *f*1A, *f*2A and *f*3A receivers the relays C, B and G would be energized and an indication circuit would be completed as follows: from a positive battery terminal, the front contact *c* of the relay C, the front contact *e* of the relay D, the front contact *c* of the relay G, the front contact *h* of the relay J, the front contact *a* of the relay P, to the relay V, and thence to the negative battery terminal. Again the last contact in this circuit controls the completion of the code generating circuit. This last contact will be picked up only when the relay P, which is in the circuit for the green light of the light signal 97, is energized and indicative of the fact that the signal is in fact green. With this relay P energized and the relay V picked up, the code would be generated indicative of this condition and this code would be generated by the following three circuits: from a positive battery terminal over the front contact *a* of the relay V to the *f*1A "mark" transmitter to produce a "mark" signal; the next circuit is from a positive battery terminal over the front contact *b* of the relay V to the *f*2A "space" transmitter; and thirdly from a positive battery terminal over the front contact *c* of the relay V to the *f*3A "space" transmitter. Accordingly, the code delivered to the central office is a coded signal which would bear the "mark," "space," "space" characteristic in the *f*1, *f*2 and *f*3 frequency range.

When it is desired to determine whether the red stop light function has been performed, the code transmitted to obtain this information would be a "mark," "space," "center" in the *f*1, *f*2 and *f*3 frequency range and this would cause relays C, D and H to be energized at the *f*1, *f*2, *f*3 range receiver location and the following indication circuit would be completed: from a positive battery terminal over the front contact *b* of the relay C, the front contact *d* of the relay D, front contact *a* of the relay H, front contact *g* of the relay J, back contact *b* of relay Q, back contact *b* of the relay O, and back contact *b* of relay P to relay U, and thence to a negative battery terminal over the front contact *b* of the relay C, the relay O, since it is only energized when the red signals are on will control the ultimate energization of the relay U which causes the generation of a code that indicates that the red lights have in fact been turned on.

The code produced by the energization of the relay U is completed over the following three circuits: from a positive battery terminal, over front contact *a* of the relay U to the *f*1A "mark" transmitter; the second circuit is from a positive battery terminal over the front contact *b* of the relay U to the *f*2A "space" transmitter; and the final circuit is traced from a positive battery terminal over the front contact *c* of the relay U to the *f*3A "center" transmitter and since would therefore produce a "mark," "space," "center" code of the *f*1, *f*2, *f*3 frequency range to be delivered to the central office for decoding.

Finally, if there is a request for indication that the signal lights have been cleared for the train to go to the left, a code in the *f*1, *f*2, *f*3 frequency range of "mark," "space," "mark" would be generated at the central office and cause the relays C, D and I to be picked up at the appropriate receivers and complete an indication circuit as follows: from a positive battery terminal over the front contact *a* of relay C, front contact *c* of relay D, front contact *e* of relay I, front contact *a* of relay Q or relay O, to the relay T, and thence to a negative battery terminal. Again the last contact in the circuit, contact *a* of the relay Q, would only be in the picked-up position when the relay Q is energized and the relay Q will be only energized if in fact the green light of the signal 99 is in an illuminated state. The relay T, therefore, when it is energized causes the completion of code generating circuits, which circuits are as follows: from a positive battery terminal over the front contact *a* of the relay T to the *f*1A "mark" transmitter, and from a positive battery terminal over the front contact *b* of the relay T to the *f*2A "space" transmitter, and finally from a positive battery terminal over the front contact *a* of the relay T to the *f*3A "mark" transmitter. This will produce a "mark," "space," "mark" code signal indicative of the fact that the signal light has actually been cleared for the train to go to the left. This signal will be transmitted back to the central office in the same manner as those other indications described earlier.

It will be appreciated, of course, that the all desired functions in the particular field location have not been set forth in this simplified version of one embodiment of this invention but that many, many more functions may be handled by logical manipulation of the code, and as pointed out earlier not only one station may in fact be involved but many stations depending on the number and combination of frequencies used.

The details of the above-described code system are set forth in expansive detail in the following documents titled (1) "Prototype Coding System, Office Transmitter and Receiver," (2) "Prototype Coding System Field Equipment," (3) "Baldwin-Tallahassee C.T.C. Coding System, Field Equipment," (4) "Baldwin-Tallahassee C.T.C Coding System, Office Transmitter," and (5) "Baldwin-Tallahassee C.T.C. Coding System Office Receiver," printed June 1, 1965, which are available through the Office of Superintendent Communications and Signals, Seaboard Air Line Railroad, Richmond, Va.

Having thus described my invention, what I claim is:

1. A code transmission system having a central command control location and a plurality of remotely controlled field locations (a) said central command control location having a plurality of command transmitting means each having a different output range and a plurality of indication receiving means, (b) said remotely controlled field location having a plurality of command receiving means as well as a plurality of condition indication transmitting means and a plurality of remote components the function of which is to be controlled, (c) each one of said command transmitting means capable of producing (1) a first level signal output, (2) a second level signal output, (3) a third level signal output, said first signal level output of the lowest range of said different output ranges effective to controllably select a specific one of said command receiving means, combinations of said second and third level signal outputs effective to control the functions of said remote components through a combination of said command receiving means, said third level signal output of said lowest range of said different output ranges effective when present in combination with first, second and third signal outputs of the remaining ranges to interrogate a remote component through said command receiving means and to simultaneously condition said condition indication transmitting means through said command receiving means to transmit a signal indicative of said command receiving means selection and said functions of said remote components, (d) said indication receiving means responsive to said signal from said condition indication transmitting means to produce an output which is indicative of the selection of a remote field location and the functions of said remote components.

2. The code transmission system of claim 1 wherein each of said command transmitting means includes a transmitter having a first modulation frequency range which range has a first center modulation frequency, (a) each of said command transmitters having means to transmit said first level signal which first level signal is of a lower modulation frequency than said first center modulation freqency, (b) each of said command transmitters having means to transmit said second level signal which second level signal is at said first center modulation frequency, (c) each of said command transmitters having means to transmit said third level signal which third level signal is of a higher modulation frequency than said first center modulation frequency, 3. The code transmission system of claim 2 wherein each of said command receivers has individual receiving means tuned to said first, second and third level signal.

4. The code transmission system of claim 3 wherein each of said condition indication transmitting means includes a plurality of transmitters each having a predetermined modulation frequency range each of which has a center modulation frequency, (a) each of said condition indication transmitters having means to transmit one of said predetermined range first level signals which is of a lower modulation frequency than each one of said predetermined range center modulation frequencies, (b) each of said condition indication transmitters having means to transmit one of said predetermined range second level signals which predetermined range second level signal is at said center modulation frequency of said predetermined range, (c) each of said condition indication transmitters having means to transmit one of said predetermined range third level signals which signal is of a higher modulation frequency than said predetermined range center modulation frequencies.

5. The code transmission system of claim 4 wherein each said command receiving means includes a station selection and component function control means as well as a station selection and component function indication means said station selection and component function control means is responsive to said command transmitting means first, second and third level output signals to effect a station selection and a component function, while said station selection and component function indication means is responsive to a specific combination of said command transmitting means first, second and third level output signals to effect a signal transmission by said condition indication transmitting means of whether said station selection and component function has occurred.

6. The code transmission system of claim 5 wherein each of said indication receiving means is responsive to said signal transmission from said indication transmitting means to thereby provide a telemetering capability at said central command location.

References Cited

UNITED STATES PATENTS

| | | | |
|---|---|---|---|
| 3,349,374 | 10/1967 | Gabrielson et al. | 340—163 |
| 2,559,390 | 7/1951 | Blaisdell | 340—163 |
| 2,852,760 | 9/1958 | Eckhardt | 340—163 |
| 3,263,217 | 7/1966 | Boosman | 340—171 |
| 2,420,093 | 5/1947 | Place | 340—163 |
| 2,576,479 | 11/1951 | Rees | 340—163 |

DONALD J. YUSKO, Primary Examiner